May 27, 1969     R. F. KOVACS ET AL     3,446,454
EMERGENCY LOCKING RETRACTOR
Filed March 20, 1967     Sheet 1 of 2
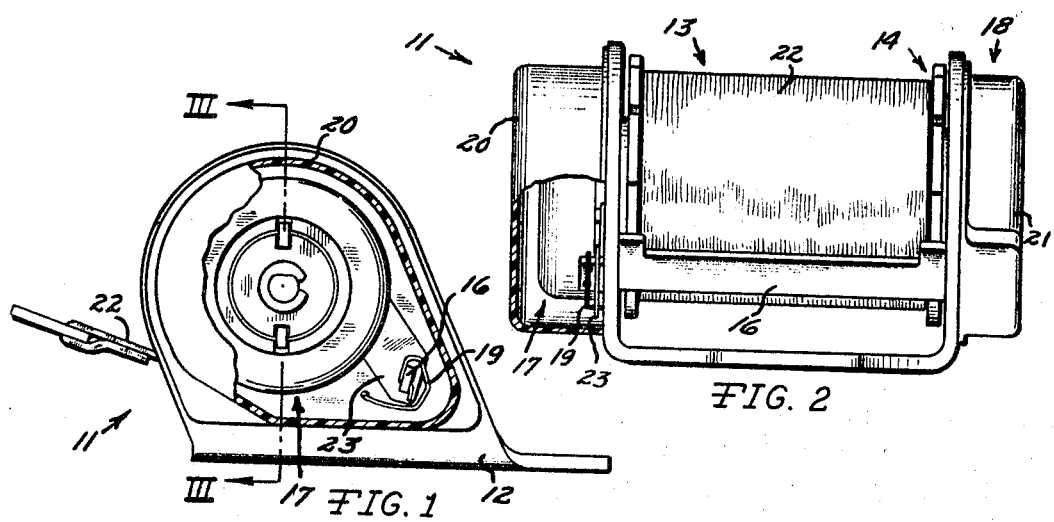
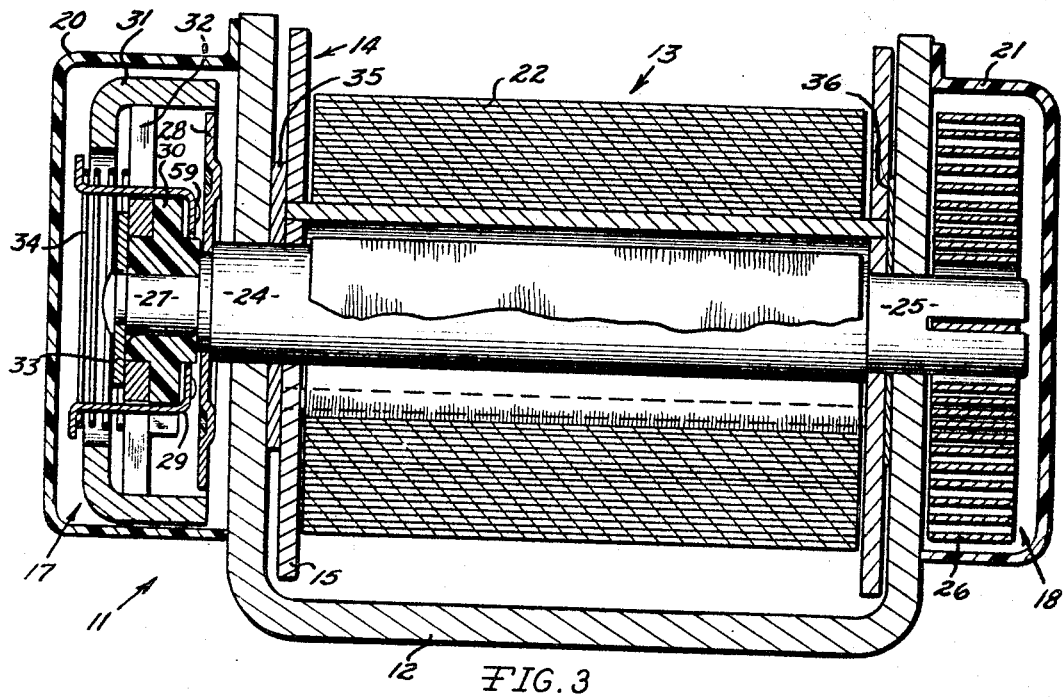
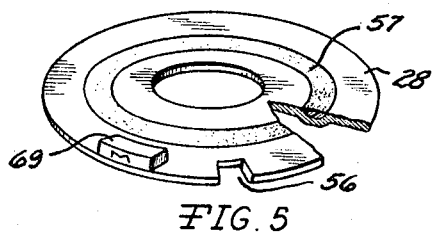
INVENTORS
DAVID L. LANG
ROY F. KOVACS
JAMES T. LIGON
BY
ATTORNEYS

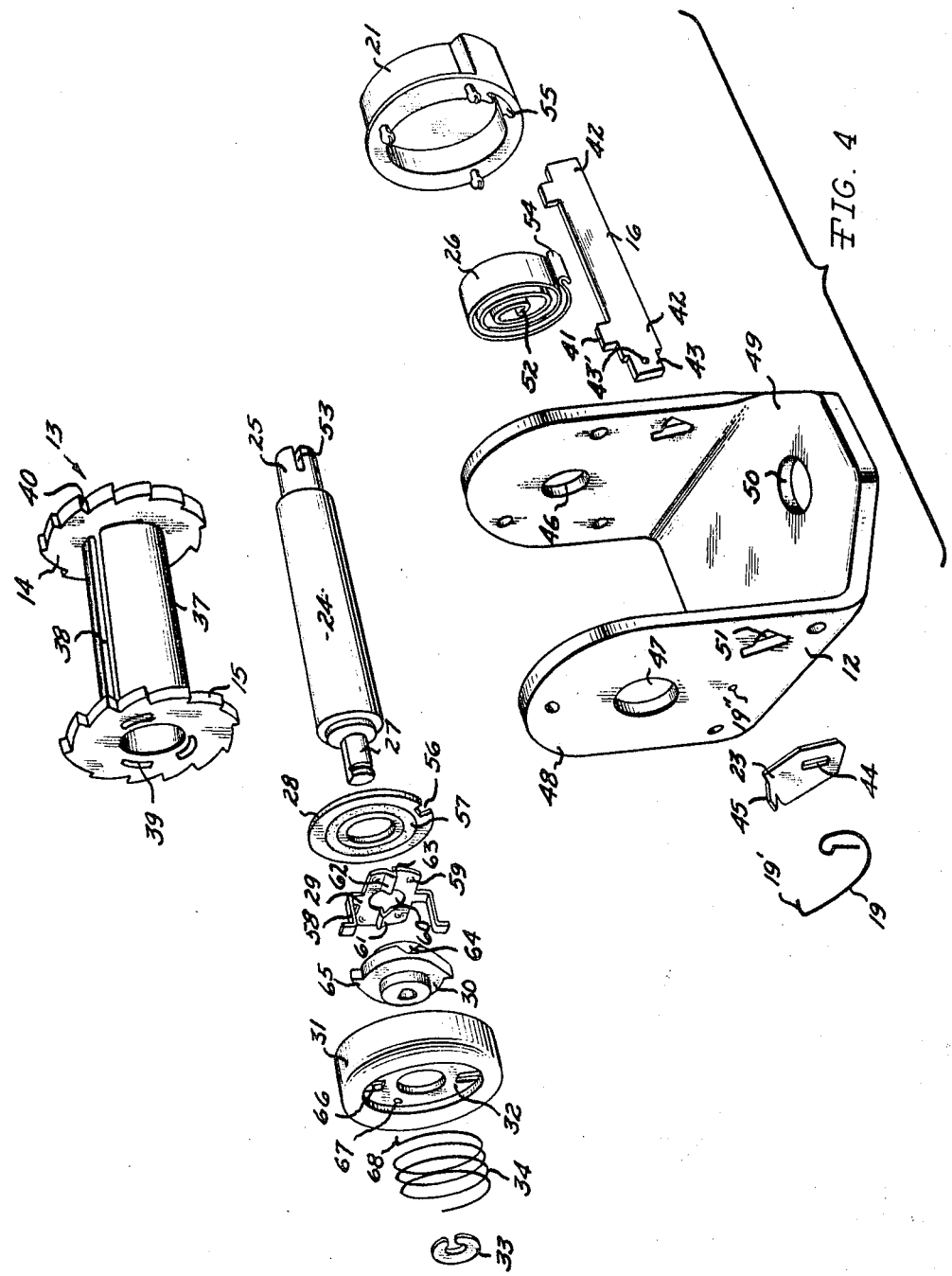

United States Patent Office 3,446,454
Patented May 27, 1969

3,446,454
EMERGENCY LOCKING RETRACTOR
Roy F. Kovacs, Royal Oak, David L. Lang, Rochester, and James T. Ligon, Almont, Mich., assignors to The Firestone Tire & Rubber Company, Akron, Ohio, a corporation of Ohio
Filed Mar. 20, 1967, Ser. No. 624,259
Int. Cl. B65h 75/48
U.S. Cl. 242—107.4          5 Claims

ABSTRACT OF THE DISCLOSURE

An inertia responsive braked reel which reel is rotationally retractable and usable with safety belting as is common in aircraft and automobile seat belts and the like. The inertia clutch is responsive to rotational acceleration in the reel in one direction only in an axial manner to move a latch piece which tangentially engages the drum or reel so that no locking forces are applied to the inertia clutch structure and wherein the latch engagement with the reel or drum is equally applied to both drum flanges. Structurally a clutch plate free on the drum shaft is axially contactable by a clutch element normally in nested ramp engagement with a cam element rotatable with the drum shaft. Acceleration of the rotational speed of the drum shaft causes the clutch element to climb the cam surfaces of the cam element urging axial movement of the clutch element toward engagement with a clutch face provided in the clutch plate and thereby causing rotational movement of the clutch plate. The clutch plate includes a dog and when the plate moves the dog moves a lever. The lever is fulcrumed on a latch plate paralleling and offset from the drum flanges so that as the lever tilts the latch plate it moves toward a latch lock blocking engagement with the drum flanges to full positive engagement with the ratchet faces of the drum flange and blocking further rotation of the drum. The latch thereupon absorbs all of the stress applied to the drum and distributes the stresses to the drum journalling thereby avoiding any shock stress on the inertial clutch structure. Upon release of stress the latch pawl lock element disengages as the retractor spring rewinds the drum to any preselected return tension as desired on the belting or cable.

---

The present invention relates to an inertial retractor for safety belts or cables as in aircraft or automotive restraint devices used in association with seats. More particularly the inertial retractor of the present invention is an acceleration sensitive structure in which acceleration of the storage drum is sensed directly and locking of the drum is commenced by a rocking action of a latch bar and a positive gripping engagement of the bar by the spool or drum flanges so that all stresses on the retractor unit are absorbed by the drum and are transmitted to the shaft and frame equally in avoidance of imposing any load stress on the sensing structure. For rewind coil spring means return the drum and free the latch bar. The retractor is position insensitive so that it may be used in a wider variety of locations and orientations in contrast to prior art devices without impairment of its operation. As will be seen the structure of the present invention is simpler than known prior devices, possesses high repetitive accuracy at any selected sensitivity, admits of less expensive fabrication and assembly, and is operable in any orientation without impairing sensitivity. Precision machining is reduced and in fabrication of the present invention manufacturing tolerances hitherto believed to be required for accurate performance in such devices is delimited without impairment of performance standards. In substantial measure this is because the inertial sensing structure is vastly simplified and none of the locking stresses are transmitted to the sensing structure. Further, the sensing structure is only lightly loaded when the latching structure is energized. Minor modification of the clutch element provides a vehicle acceleration sensing safety back up.

Accordingly the principal object of the present invention is to provide a new and improved acceleration sensitive inertial retractor which is operable from any position.

Another object is to provide a vastly simplified emergency locking retractor device in which the locking is positive from a small amount of pilot movement and where none of the stresses of locking or holding are imposed on the acceleration sensing structure.

Another object is to provide a simple inertia sensing device for retractor actuation.

Another object of the present invention is to provide a latch gripping lock easily overrun for rewind or retraction.

Still another object is to provide a structure admitting the inclusion of a vehicle acceleration sensitive accessory to provide a dual lock within the identiacl structure.

Still another object is to provide a fail-safe device in which failure of any component in the pilot-sensor linkage causes continuing sensitiveness to emergency locking situations.

Other objects, including a superior performance at lower ultimate cost and without impairment of repetitive accuracy will be appreciated by those skilled in the art as the description proceeds.

The known state of the prior art in inertia retraction devices is exemplified by reference to United States Letters Patents: 2,071,903; 2,403,653; 2,434,119; 2,845,233; 2,845,234; 2,886,259; 2,998,976; and 3,058,687 all directed to inertia lock devices in which rewind devices are shown and which include a wide variety of relatively complex inertia responsive sensors to lock the cable or belting against paying out when acceleration or rotation of the drum or belt receptacle occurs. While a lock upon the moving belting or cable is accomplished in a variety of ways, the ultimate crash stresses from deceleration of an automobile in crash or stopping is unequally transmitted to the retractor frames and serious warpage of parts is likely which can damage or render the sensing structure inoperative. No dual lock or back-up lock is known in the prior art as integrated in a pilot-sensor mechanism, and accordingly the present structure is distinguishable over the art and indeed is inventive in providing an improved performance, higher accuracy, and lower ultimate cost.

General description

In general, a retractor drum is provided which is axially keyed to a shaft and the shaft is then journalled in a suitable frame. The drum is a receptacle for web belting or cable and in most applications the cable or belting is secured to a harness or belt structure which encircles and restrains a driver or passenger in, for example, automobiles or aircraft. The peripheral faces of both drum flanges are provided with ratchet faces. A retractor spring of the flat spiral type is secured to the frame or housing with one end of the spring secured to the shaft. The magnitude of the rotational spring bias on the shaft is such as to increase as the drum rotates to pay out cable or belting. Ideally, a constant force applied to webbing over its entire extension is desirable. Hence, as pull stress of the belting or cable ceases the spring causes the drum to counter-rotate thereby picking up the slack in the cables or belting and applying a selected bias tending to keep the drum filled with the cable or belting. This allows the passenger or driver relative freedom of movement against the bias of the retractor spring.

Paralleling the drum and poised behind the drum is a movable latch which is tiltable toward and away from contact with the drum flanges. When the latch bar tilts toward the flanges the teeth of the ratchet engage and actually confine the latch bar into lock relation at the root of the teeth so long as stress is applied. Relaxation of stress on the belting or cable drum allows the retractor spring to commence its take up function and automatically disengages the latch bar.

The sensor-actuated latch bar transmits all locking stress to the frame and equal forces are applied by the drum to the shaft and shaft journalling structure. Hence, a better and symmetrical distribution of stresses to the frame occurs and the strength of the structure to failure is materially extended over previously known emergency locking devices.

The tilting of the latch bar on the frame to lock position is by a lever extending from and movable with the latch bar. The lever is is moved or energized by an inertial imbalance responsive to accelerated flow of belting or cable from the drum. This allows constant velocity withdrawal without energization of the inertial responsive structure and without lock up. The preferred actuation of the inertial responsive structure is by providing a fly wheel rotatable with the shaft and providing a thrust base for a light compression spring. The spring supports a coaxially mounted clutch drive element free of the drum shaft but rotatable with the fly wheel. The base of the clutch drive includes downwardly extending detent projections and an oppositely oriented cam face. Keyed to the drive shaft and intermediate the fly wheel and clutch drive element a nesting cam is provided which normally is urged into mating contact with the cam face on the clutch drive. One face of the radial cam surface of the cam is ramped. The other face thereof is abruptly shouldered. Upon acceleration of the rotation of the drum as by sudden stopping of the vehicle the free cam drive element lags behind the fly wheel, hence climbs the ramp surface, depresses the compression spring and engages a normally free rotating clutch plate with its detent projections. The clutch plate, once engaged, rotates about its axis to a limited extent and the clutch plate moves a lever to rock the lock plate into the path of the rotating drum teeth. Force involved is negligible since the teeth of the ratchet seize and capture the lock plate effectively and directly blocks further rotation. This is what happens for example in a sudden stop in an automobile and the belt is locked until the force on the belt is withdrawn. Upon withdrawal of the force upon the belt or cable the retracting spring rewinds the belt or cable and the lock plate or bar is pushed out of ratchet engagement assisted by the light return spring action on the lever. Since a mass, positioned to move in a line parallel or tangential to a line of vehicle or aircraft travel is sensitive to deceleration, the clutch plate or disc may be weighted tangentially and in accord with the positioning of the retractor in a vehicle. Then, upon deceleration the mass is projected forward, tangentially, imparting adequate force, independent of clutching to rotate the clutch plate and engage the lock bar. Such an arrangement is accommodated by clearance in the tamper preventing housing to provide a safety back-up to the inertia clutch system or drum lock.

In the drawings:

FIGURE 1 is a side elevation view of an inertia retractor in accord with the present invention and having a portion of the tamper preventing housing cover cut away to reveal the coaxial clutch structure.

FIGURE 2 is a rear elevation view of the inertia retractor seen in FIGURE 1 and revealing the lock bar in unlatched position.

FIGURE 3 is a cross section rear elevation view taken on line III—III of FIGURE 1 and enlarged to clearly show the clutch mechanism.

FIGURE 4 is an exploded perspective view of the inertia retractor structure and revealing the structural simplicity and assembly of the inertia device of the present invention.

FIGURE 5 is a perspective view of a normally free running clutch plate partially cut away to reveal the clutch pad portion and modified to include a selectively located small mass adequate to render the clutch plate position sensitive and provide a back-up lock for inertial lock up of the inertia device.

*Specific description*

By specific reference to FIGURES 1 and 2 an inertia lock retractor reel 11 in accord with the present invention is shown. The inertia lock take-up reel 11 comprises a channel shaped frame 12; a drum 13, the flanges 14 thereof including peripheral ratchet faces 15; a tiltable lock or latch bar 16; an inertia clutch assembly 17; a retractor assembly 18; a latch return spring 19; and cover 20 over the inertia clutch assembly 17 and cover 21 protecting the retractor assembly 18. Web belting 22 is wound on the drum 13. While belting 22 is shown as used in automobile safety belts and harness, the drum 13 may be made narrow to accommodate cable, not shown, but well understood in the art as an option in equipment as herein set forth. The latch lever 23 provides an operative connection between the inertia clutch assembly 17 and the lock or latch bar 16. A spool cover (not shown) assuring level wind on the drum 13 may be employed in a variety of forms.

In FIGURE 3 the assemblage of drum 13 journalled in the frame 12 and secured to the shaft 24 is best appreciated. The shaft 24 is provided with an axial extension 25 which extends through the frame 12 on one side. The spiral flat spring 26 is secured to the shaft extension 25 at one end and is secured to the fixed frame 12 or case 21 at the other end so that as the shaft 24 rotates with the drum 13 a rotational return bias to rewind the drum is applied by the spring 26. The retractor mechanism 18 is protected by the cover 21.

An axial extension 27 of the shaft 24 projects into the space confined by the housing 20 and the inertia clutch assembly 17 is secured thereon. The clutch assembly 17 includes clutch plate 28, free on the shaft 24; the clutch driver element 29; the cam element 30 keyed to shaft extension 27; the flywheel 31 including spacer platform 32; snap ring or other securing means 33 securing the assembly against axial displacement; and clutch spring 34 which acts in compression against the platform 32 and the clutch driver element 29 urging normal separation of driver element 29 from clutch plate 28. By reference to FIGURE 4 the relationship of these clutch elements is best appreciated and the simplicity of assembly is understood. Thrust washers 35 and 36 (FIGURE 3) flank the flanges 14 of the drum 13 on the shaft 24.

The drum 13 as seen in FIGURE 4 includes a split tube element 37 on which belt or cable is spooled. The longitudinal split 38 provides an aperture for attachment of belting or cable. Short longitudinal projections 39 extend through mating openings in the flange pieces 14 and are staked brazed or otherwise secured in place to provide the drum 13 as shown. The peripheral ratchet faces or teeth 15 of the flanges 14 are slightly undercut on lock faces 40 so as to engage and capture the bar 16. Hence, the bar 16 is provided with two projecting lock surfaces 41 which are bevelled and are in dimensional registry with the path of the teeth 15 so that as the bar 16 is rocked toward the drum 13 the locking action of the bar against the teeth 15 is positive. In other regards the latch bar 16 is provided with extension shoulders 42 and at one end with the lever-spring projection 43. The projection 43 extends into the mating opening 44 in the operating latch lever 23. Hence movement of the lever 23 causes corresponding movement of the bar 16. The lever 23 is caused to move on the fulcrum of the bar 16 when the upstanding dog 45 is moved by the clutch plate 28 when it is engaged by the clutch drive element 29.

The drum 13, as will be appreciated is secured to the shaft 24 for rotation therewith. The shaft 24 is journalled in registering openings 46 and 47 in the upstanding sides 48 of the frame 12. The web 49 of the channel shaped frame 12 is provided with mounting means such as the opening 50 so that the inertia retractor 11 may be selectively secured to automotive or aircraft structure as desired. Arcuate registering openings 51 are provided in each of the walls 48 of the frame 12 so as to movably position the bar 16 in parallel spaced apart relation to the drum 13. The spring 19, secured at one end to the frame 12, by extending the projection 19' into the opening 19" is at its other end secured to the bar 16 through opening 43' providing a light bias on the bar 16 urging it away from engagement with the drum flanges 14.

The retractor spring 26 is locked to the shaft extension 25 as by insertion of the end 52 in the diametral slot 53 in the extension 25. A curl 54 is provided at the other end of the spiral spring 26 and this is lockably inserted in the spring retaining slot 55 in the cover 21. When thus assembled the retractor assembly 18 applies a spring return bias as webbing 22 is payed out from the drum 13.

Thus far it will be seen that a drum 13, having ratchet faced flanges 14 is rotatable journalled in a frame 12 and spring retraction means are provided for rewind of the drum 13. The latch bar 16 has been deescribed as capable of tilting to lock the drum 13 against paying out of webbing. Further, it is now appreciated that the lever 23 can accomplish such locking against the light bias of the lever spring 19. It should also be appreciated that without the bias of spring 19 the bar 16 is pushed out of lock engagement when stress against the webbing 22 is relaxed because the retraction causes the ratchet faces or teeth 15 to rotate oppositely from their locking motion and disengagement is automatic. The value of the spring 19 on disengagement of the bar 16 is to avoid noise by avoidance of bar to drum chattering contact and to prevent undesired bar to ratchet engagement in any selected position.

It is now of value to examine the inertia clutch assembly 17 positioned axially on the shaft extension 27 and outboard of the side 48. The plate 28 is provided with a notch 56 extending radially inward from the periphery thereof. The notch 56 matingly receives the dog or lug 45 of the lever 23. Hence the plate 28, when rotated, moves the lever 23 on the fulcrum of the bar 16 in the opening 51 and can tilt the bar 16. The plate 28 is otherwise disc shaped and is provided with a coaxial channel 57 filled with a friction material such as a resin. Since the clutch plate 28 is free of the shaft extension 27 it is normally retained against rotation by the dog 45 and by the slight bias of the spring 19 acting on the lever through the latch bar 16. The clutch driver 29 is provided with a pair of spider legs 58 which extend coaxially of the driver 29 and outwardly through the platform 32 of the inertia or flywheel 31. A plurality of detent-like projections 59 are radially and concentrically arranged about the body web 60 of the clutch driver 29. These projections 59 are in registry with and project toward the resin filled channel 57 in the clutch plate 28. As previously mentioned the clutch driver 29 is normally biased out of engagement with the clutch plate 28, but is free on the shaft extension 27 for axial movement toward and away from the clutch plate 28 as will be seen. The clutch driver 29 is provided with a plurality of radial raised surfaces 61 each comprising an inclined or ramp portion 62 and a plane drop portion 63. These matingly nest in the corresponding recesses 64 of the cam element 30. The cam element 30 is also provided with shoulders 65 which extend peripherally and are spaced to provide stops preventing overtravel of clutch driver 29 by engaging the spider arms 58 of the clutch driver 29. Since the cam 30 is keyed to the shaft 24 on extension 27 thereof the shoulders 65 cause corresponding movement of the clutch driver 29 and the driver 29 is secured in nesting or pocketing engagement in recesses 64. This engagement is assured because the legs 58 pass through the registering openings 66 in the platform 32 of the flywheel 31 and the spring 34 applies an axial outward force on the legs 58. The platform 32 also defines an opening 67 therethrough and into which the end 68 of the spring 34 is retained. The flywheel 31 is free to rotate on the shaft extension but the legs 58 cause it to rotate with the clutch driver 29. The snap ring 33 secures the assembly against axial displacement on the shaft extension 27. As described, only one member, the cam element 30 is keyed to the shaft 24. However, so long as the clutch driver 29 is pocketed in the ramp recesses 64 of the cam element 30 all of the inertia clutch assembly moves with the shaft 24 and with the drum 13. An exception is the clutch plate 28 which remains stationary. On acceleration, however, the clutch driver 29 is urged away from nesting contact in the ramp recess 64 and moves axially inboard against the bias of the spring 34 and its detent-like projections engage the clutch plate 28 tilting the lever 23 and engaging the latch bar 16 to stop the drum 13. When motion of the drum 13 stops the clutch driver 29 disengages from the plate 28 and irrespective of the stresses applied symmetrically to the drum by force on the webbing none of those forces are applied to the clutch structure 17. The symmetric and substantially tangential engagement of the bar 16 in the ratchets 15 of the drum 13 cause all stresses to be carried into the frame 12 through the journalling and the lock bar 16 and no axial components are applied to the structure. Upon relaxation of stresses on the webbing or cable the retractor 18 smoothly recoils the webbing and disengages the lock bar 16.

Sensitivity of the described structure is dependent upon the magnitude of the strength of the spring 34. In general the lighter the spring 34, the more sensitive the structure is to acceleration. The sensitivity is also affected by adjustment in the ramp angle in the cam recess 64. Sensitivity is also a function of the moment of inertia or mass distribution in the flywheel 31. As described, the emergency locking retractor structure is insensitive to position and wherever it may be located in a vehicle it responds by locking to accelerating movement of the drum 13.

By reference to FIGURE 5 a modification of the clutch plate 28 is shown by the selected attachment of a mass 69 adjacent to the periphery of the disc or plate 28. The disc or plate 28 is then rendered sensitive to vehicle deceleration since the mass 69 is then inertially oriented to rotate the clutch plate independent of the described clutch mechanism and the clutch plate can directly lock the bar 16 through its action on the lever 23. However, it will be appreciated that the mass 69 must be selectively located on the disc periphery in accord with the location of the structure in a vehicle. As will be appreciated clearance for the movement of mass 69 is provided between the flywheel 31 and clutch or sensor assembly 17. When used in connection with the structure of the inertia clutch as previously described, the appropriate addition of the mass 69 provides a back-up or supplemental lock.

By virtue of the described structure devices in accord with the present invention provide greatly improved stress distribution while substantially simplifying the structures hitherto understood and the simplicity of the structure and its amenability to mass production suggests increased and more economical production. The same structure as described, and employing a velocity sensitive pilot-sensor, provides (where velocity sensing is desired) an effective velocity locking device, as contrasted with the acceleration sensing device. Similarly, where the pilot-sensor, sensing any vehicular condition, tilts the latch bar in response to the condition sensed, the same structure is usable.

We claim:

1. An emergency locking reel structure for use with body restraints in vehicles comprising:
   (a) a frame;
   (b) a drum journalled in said frame, said drum including a pair of flanges each provided with peripheral ratchet faces;
   (c) a lock bar rockably movable in said frame toward and away from said ratchet faced flanges;
   (d) a lever engaging said lock bar to accomplish selected tilting thereof;
   (e) a spring bias on said lever normally urging said lever in a direction to avoid rocking said lock bar toward said flanges; and
   (f) a clutch structure coaxially secured for rotation with said drum and actuated by change in vehicular movement affecting said drum and moving said lever whereby said lock bar engages said ratchet flanges.

2. An emergency locking reel structure for use with body restraints in vehicles comprising:
   (a) a positive grip bar pawl element;
   (b) a drum provided with a pair of ratchet faced flanges in parallel adjacent registry with said bar pawl;
   (c) a pilot-sensor secured for rotation with said drum responsive to change in vehicular movement which causes accelerated rotational movement of said drum; and
   (d) a lever selectively engaged by said sensor pilot and tilting said bar pawl element toward blocking engagement with said ratchet faced flanges on said drum.

3. An emergency locking reel structure for use with body restraints in vehicles comprising:
   (a) a frame;
   (b) a drum journalled in said frame, said drum including flanges provided with peripheral ratchet faces;
   (c) a lock bar rockably movable in said frame toward and away from said ratchet faced flanges whereby both of said flanges are engaged simultaneously and lock stresses are equally distributed into said frame; and
   (d) an axially movable clutch structure coaxially provided in relation to said drum and rotatable therewith, said clutch sensitive to acceleration of said drum and actuating the rocking motion of said lock bar.

4. An emergency locking reel structure for use with body restraints in vehicles comprising:
   (a) a frame;
   (b) a drum journalled in said frame, said drum including flanges provided with peripheral ratchet faces;
   (c) a lock bar rockably movable in said frame toward and away from said ratchet faced flanges whereby both of said flanges are engaged simultaneously and lock stresses are equally distributed into said frame;
   (d) an axially movable clutch structure coaxially provided in relation to said drum and rotatable therewith and sensitive to acceleration of said drum and upon acceleration actuating the rocking motion of said lock bar; and
   (e) a lever acted upon by said clutch and connected to said lock bar rocking said lock bar into stop engagement with said ratchet flanges.

5. An acceleration sensing structure for emergency locking reels comprising:
   (a) a shaft rotatable with a reel;
   (b) a notched clutch plate on said shaft and free from rotation with said shaft;
   (c) a lever engaged for movement with said clutch plate;
   (d) a clutch driver on said shaft and axially movable toward and away from said clutch plate; and
   (e) a cam keyed to said shaft and nestably receiving said clutch driver in a ramped recess, whereby said shaft upon acceleration urges said driver axially away from said cam to engagement with said clutch plate in one direction of rotation only whereby said lever is moved.

References Cited

UNITED STATES PATENTS

| | | | |
|---|---|---|---|
| 2,557,313 | 6/1951 | Quilter | 242—107.4 X |
| 2,569,020 | 9/1951 | Rotherham | 242—107.4 |
| 3,244,382 | 4/1966 | Blake | 242—107.4 |
| 3,338,532 | 8/1967 | Board et al. | 242—107.4 |
| 3,348,789 | 10/1967 | Hirsch | 242—107.4 |

WILLIAM S. BURDEN, *Primary Examiner.*